US008654486B2

(12) United States Patent
Amato et al.

(10) Patent No.: US 8,654,486 B2
(45) Date of Patent: Feb. 18, 2014

(54) SUPERCONDUCTING FAULT CURRENT LIMITER SYSTEM

(75) Inventors: Mark R. Amato, Bedford, MA (US); Paul J. Murphy, Reading, MA (US); James D. Strassner, Austin, TX (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 0 days.

(21) Appl. No.: 13/417,773

(22) Filed: Mar. 12, 2012

(65) Prior Publication Data

US 2012/0236440 A1 Sep. 20, 2012

Related U.S. Application Data

(60) Provisional application No. 61/453,331, filed on Mar. 16, 2011.

(51) Int. Cl.
*H02H 3/00* (2006.01)

(52) U.S. Cl.
USPC .......... 361/19; 361/8

(58) Field of Classification Search
USPC .......... 361/8–12, 19
See application file for complete search history.

(56) References Cited

U.S. PATENT DOCUMENTS

| | | | | |
|---|---|---|---|---|
| 5,617,280 | A * | 4/1997 | Hara et al. | 361/19 |
| 2007/0139832 | A1 * | 6/2007 | Lee et al. | 361/19 |
| 2008/0103051 | A1 * | 5/2008 | Park et al. | 505/220 |
| 2009/0190274 | A1 | 7/2009 | Ko et al. | |

FOREIGN PATENT DOCUMENTS

GB 2439764 A 1/2008

* cited by examiner

*Primary Examiner* — Danny Nguyen

(57) ABSTRACT

A SCFCL system includes a first SCFCL, a second SCFCL, and a controller configured to control at least one switch to couple the first SCFCL to a power line between an AC source and a load, and to electrically isolate the second SCFCL from the power line during a first operating mode when the first SCFCL is in service and the second SCFCL serves as a spare. During the first operating mode, the second SCFCL, may be maintained in a latent standby state or an immediate standby state. The second SCFCL may be automatically switched into service to provide for fault current protection in case the first SCFCL needs to be taken out of service for maintenance, repair, or replacement.

14 Claims, 3 Drawing Sheets

100
118
SCFCL SYSTEM
114-1
Rs
140-1
SCFCL
SC 141-1
103
105
108
110
S
107
107
S
102
106-1
114-2
112
Rs
140-2
SCFCL (SPARE)
SC 141-2
160
106-2
SWITCHES SCFCLs
120
124
CONTROLLER
HOST SYSTEM
132
SENSOR(S)
SCFCLs
REFRIG. SYSTEM
122

SUPERCONDUCTING FAULT CURRENT LIMITER SYSTEM

CROSS REFERENCE TO RELATED APPLICATIONS

This application claims the benefit of provisional patent application No. 61/453,331, filed Mar. 16, 2011, which is incorporated herein by reference.

FIELD

This disclosure relates to superconducting fault current limiters, and more to particularly to a redundant superconducting fault current limiter system.

BACKGROUND

A superconducting fault current limiter (SCFCL) is a device that limits fault currents in a power system. The power system may include transmission and distribution networks to deliver power to differing industrial, commercial, and residential loads. A fault current is an abnormal current in the power system due to a fault such as a short circuit. A fault current may occur due to any number of events such as severe weather damaging power lines and components, e.g., lighting striking the power system. When faults occur, a large load appears instantaneously. The network, in response, delivers a large amount of current (i.e., fault current) to this load or, in this case, the faults. This fault current condition is undesirable since it may damage the network or equipment connected to the network.

A SCFCL includes a superconductor positioned in a cryogenic tank. The superconductor is in a superconducting state having zero resistance during normal or steady state operation. To maintain the superconductor in the superconducting state, the superconductor is operated below its critical temperature, critical current density, and critical magnetic field. If any one of these three is exceeded, the superconductor quenches from its superconducting state to a normal state and exhibits a resistance. Over time, a SCFCL may need to be taken out of service for maintenance, repair, or replacement. A drawback of this is that the associated power system is left unprotected from fault currents during this time period.

Accordingly, there is a need in the art for an SCFCL system that overcomes the above-described inadequacies and shortcomings.

SUMMARY

According to a first aspect of the disclosure, a SCFCL system is provided. The SCFCL system includes a first SCFCL, a second SCFCL, and a controller configured to control at least one switch to couple the first SCFCL to a power line between an AC source and a load, and to electrically isolate the second SCFCL from the power line during a first operating mode when the first SCFCL is in service and the second SCFCL serves as a spare.

According to another aspect of the disclosure, a three phase SCFCL system is provided. The three phase SCFCL includes a first SCFCL for a first phase having a first switch coupled to an input of the first SCFCL and a second switch coupled to an output of the first SCFCL, a second SCFCL for a second phase having a third switch coupled to an input of the second SCFCL and a fourth switch coupled to an output of the second SCFCL, a third SCFCL for a third phase having a fifth switch coupled to an input of the third SCFCL and a sixth switch coupled to an output of the third SCFCL, and a fourth SCFCL having an input coupled to the first switch, third switch, and fifth switch and an output coupled to the second switch, fourth switch, and sixth switch. The three phase SCFCL system also includes a controller configured to position the first switch, the second switch, the third switch, the fourth switch, the fifth switch, and the sixth switch to have a current flow through the first SCFCL, the second SCFCL, and the third SCFCL and to electrically isolate the fourth SCFCL during a first operating mode when the first SCFCL, the second SCFCL, and the third SCFCL are in service and the fourth SCFCL serves as a spare.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
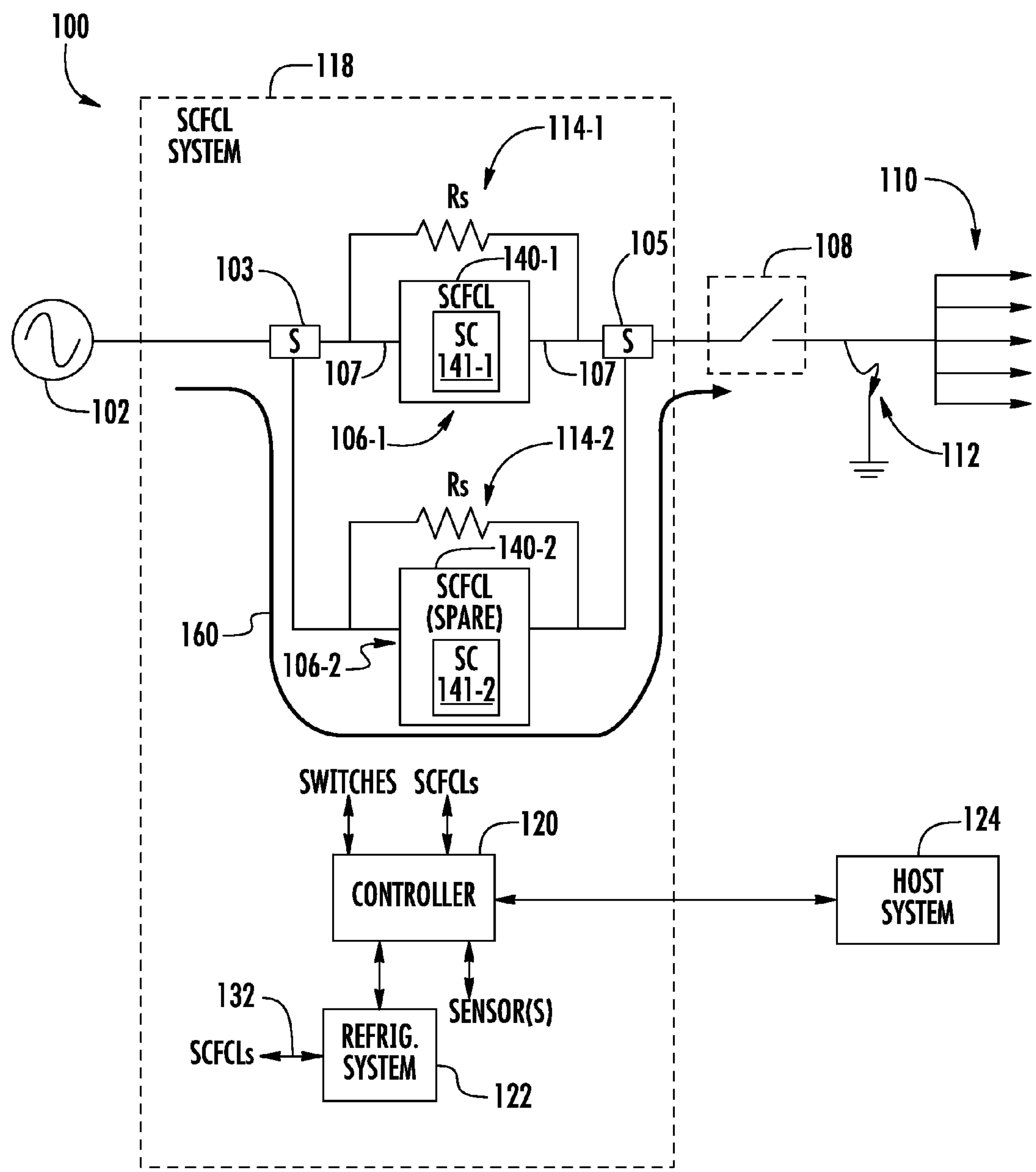
FIG. 1 is a circuit diagram of a SCFCL system consistent with an embodiment of the disclosure.

The present invention will now be described more fully hereinafter with reference to the accompanying drawings, in which embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

FIG. 1 is a circuit diagram of one power system 100 having a SCFCL system 118 consistent with an embodiment of the disclosure. This is but one simplified power system 100 and those skilled in the art will recognize many other power systems having a SCFCL system 118 consistent with the disclosure. The power system 100 includes an AC power generator 102, the SCFCL system 118, a circuit breaker 108 which is normally closed, and differing loads 110 such as industrial, commercial, and residential loads. A fault condition may occur at location 112 as illustrated by the inadvertent path to ground.

The SCFCL system 118 includes a first SCFCL 106-1, a second SCFCL 106-2, a controller 120, a refrigeration system 122, and switches 103, 105. Each SCFCL 106-1, 106-2 has a parallel shunt 114-1, 114-2. Each SCFCL 106-1, 106-2 also has a cryogenic tank 140-1, 140-2 defining an interior volume and a superconductor 141-1, 141-2 positioned in the interior volume. The cryogenic tanks 140-1, 140-2 may be fabricated of differing materials such as dielectric materials and/or thermally insulating materials. The superconductors 141-1, 141-2 may be any type of superconducting material such as yttrium barium copper oxide (YBCO) that exhibits superconducting properties when held below its critical temperature, critical current density, and critical magnetic field. The superconductors 141-1, 141-2 may be fabricated of superconducting tape and may have different modules depending on the quantity of superconducting tape required.

The refrigeration system 122 is configured to provide a cryogenic cooling fluid to the cryogenic tanks 140-1, 140-2 of each SCFCL 106-1, 106-2 to cool the associated superconductors 141-1, 141-2 below its critical temperature. For high temperature superconductors, the critical temperature may be between about 77° K and 93° K. The refrigeration system 122 may include a cryogenic cooling unit to cool cryogenic cooling fluid received from associated cryogenic tanks 140-1, 140-2 before providing cooled cryogenic fluid back to the same as illustrated by arrow 132. Although one refrigeration system 122 is illustrated, each SCFCL 106-1, 106-2 may have its own associated refrigeration system. The refrigeration system 122 may also include valves, pumps, sensors, and a storage tank to store additional cryogenic cooling fluid. The cryogenic cooling fluid may be liquid nitrogen, liquid helium, liquid argon, liquid neon, etc. and/or mixtures of the same.

The controller 120 can be or include a general-purpose computer or network of general-purpose computers that may be programmed to perform desired input/output functions. The controller 120 can also include other electronic circuitry or components, such as application specific integrated circuits, other hardwired or programmable electronic devices, discrete element circuits, etc. The controller 120 may also include communication devices, data storage devices, and software. The controller 120 may communicate with and control a variety of systems and components such as the switches 103, 105, differing components and subsystems of each SCFCL 106-1, 106-2 including temperature sensors and current sensors, and the refrigeration system 122. The controller 120 may also communicate with a host system 124, e.g., a telemetry system, to inform the host system 124 of particular operating conditions of the SCFCL system 118. The host system 124 may also have the ability to remotely control the SCFCL system 118 by communicating with the controller 120.

During one operating mode, the first SCFCL 106-1 is in service and the second SCFCL 106-2 is electrically isolated from the power line 107 by the position of the switches 103, 105 so the second SCFCL 106-2 serves as a spare. Under steady state conditions, the AC power generator 102 provides power to the loads 110. The circuit breaker 108 is closed and current flows through the power line 107 and the first SCFCL 106-1 to the loads 110. The superconductor 141-1 of the first SCFCL 106-1 is in a superconducting state exhibiting zero resistance. A fault condition may occur at location 112 as illustrated by the inadvertent path to ground. In response, the AC power generator 102 attempts to deliver a large amount of fault current. The superconductor 141-1 quenches and exhibits a resistance much larger than the resistance of the shunt 114-1. Hence, the fault current is commutated into the shunt 114-1 which limits the fault current to an acceptable level by reducing the peak to peak value of the fault current before the circuit breaker 108 can open (a conventional circuit breaker 108 typically takes 2 to 3 cycles at 60 Hz before opening). During a post fault time interval, the circuit breaker 108 opens and no current is provided to the loads 110.

Over time, the first SCFCL 106-1 may need to be taken out of service for maintenance, repair, or replacement. Advantageously, during another operating mode, the second SCFCL 106-2 is available to take the place of the first SCFCL 106-1. To change to this operating mode, the switches 103, 105 may be responsive to a signal from the controller 120 to switch to a new position that effectively directs current from switch 103 towards the second SCFCL 106-2 and back though the other switch 105 to the circuit breaker 108 as illustrated by the path 160. As such, the first: SCFCL 106-1 may be taken out of service for maintenance, repair, or replacement while the power system 100 is protected by fault currents by the second SCFCL 106-2. The controller 120 may also communicate with the host system 124 to alert the host system 124 of this event.

The trigger for determining when the first SCFCL 106-1 is demoted and the second SCFCL, 106-2 is promoted or prepared for promotion may be a manual trigger or an automatic trigger in response to a condition. For instance, a manual trigger may be undertaken to reposition switches 103, 105 to feed current along the path 160 in order to maintain, repair, or replace the first SCFCL 106-1. The automatic trigger may be controlled by the controller 120 to automatically control the switches 103, 105 to promote the second SCFCL 106-2 in response to a condition. The condition may be an aggregate number of fault current conditions experienced by the first SCFCL 106-1. For example, the aggregate number of fault conditions that causes the superconductor 141-1 to quench may be five. After this, the second SCFCL 106-2 may be promoted into service so first SCFCL 106-2 can be demoted from service to be checked and repaired as necessary. The condition may also be an elapsed time period representative of a need for maintenance of the first SCFCL 106-1. The condition may also be a fault of a component of the first SCFCL 106-1. For example, a refrigeration system 122 servicing the first SCFCL 106-1 may have one or more sensors to sense operating conditions of the same and to provide a signal to the controller 120 representative of a fault. In this way, since a fault of the refrigeration system 122 or a component thereof may jeopardize the temperature at which the superconductor 141-1 can be maintained, the first SCFCL 106-1 may be readily removed from service and effectively replaced with the second SCFCL 106-2 to maintain continuity and fault current protection for the power system 100. Finally, the condition may also be a signal representative of a degraded operation of the first SCFCL 106-1 provided to the controller 122.

During the operating mode when the first SCFCL 106-1 is in service and the second SCFCL 106-2 serves as a spare, the second SCFCL 106-2 may be kept in an immediate standby state or a latent standby state. In the immediate standby state, the refrigeration system 122 is configured to provide a cryogenic cooling fluid to the cryogenic tank 140-2 to maintain a temperature of the superconductor 141-2 positioned within an interior volume of the cryogenic tank 140-2 below a critical temperature of the superconductor. Again, for high temperature superconductors, the critical temperature may be between about 77° K and 93° K. The controller 120 may also monitor the condition of the second SCFCL 106-2. A benefit of the immediate standby state is that the second SCFCL 106-2 is ready to be promoted as soon as the switches 103, 105 are repositioned to direct current flow along path 160. One drawback with the immediate standby state is the energy and associated cryogenic cooling fluid flow required to maintain the superconductor 141-2 below its critical temperature.

The second SCFCL 106-2 may also be kept in the latent standby state. In this state, no cryogenic cooling fluid is provided to the cryogenic tank 140-2. Once triggered to transition from the latent standby state to the immediate standby state, the controller 120 may instruct the refrigeration system 122 to start providing cryogenic cooling fluid to the cryogenic tank 140-2 and may monitor other signals to verify the second SCFCL 106-2 is ready for service. Once the second SCFCL 106-2 is ready for service, the controller 120 may instruct switches 103, 105 to promote the second SCFCL 106-2 so current flows along path 160. One benefit of this latent standby state is that no energy is spent cooling the cryogenic fluid for second SCFCL 106-2 since it is empty of cryogenic cooling fluid until being readied for service or immediate standby. Another benefit is that personnel have ready access to the interior volume of the cryogenic tank 140-2 to perform any inspection or maintenance. A drawback is the time needed to prepare the second SCFCL 106-2 for service. However, if the promotion of the second SCFCL 106-2 does not need to be immediate, this is an effective solution.

Figure 2:
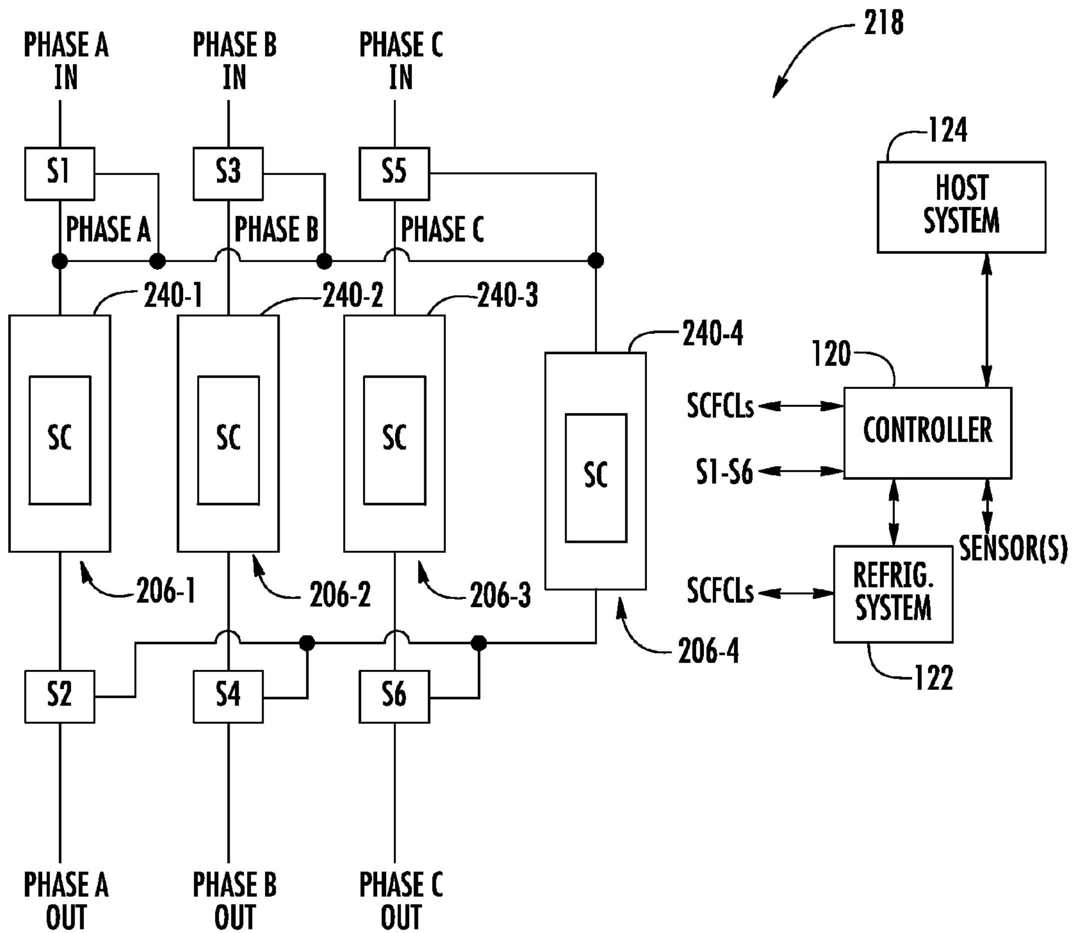
FIG. 2 is a block diagram of a three phase SCFCL system consistent with an embodiment of the disclosure.

Turning to FIG. 2, a block diagram of a three phase SCFCL system 218 consistent with an embodiment of the disclosure is illustrated. Compared to FIG. 1, the three phase SCFCL system 218 illustrates three phases (A, B, and C) and a SCFCL for each phase with a fourth SCFCL 206-4. For simplicity of illustration, only the cryogenic tanks 240-1, 240-2, 240-3, and 240-4 are illustrated for each SCFCL 206-1, 206-2, 206-3, 206-4. Six switches S1-S6 may be used to effect promotion and demotion of various SCFCLs. Other similar components are similarly labeled.

Figure 3:
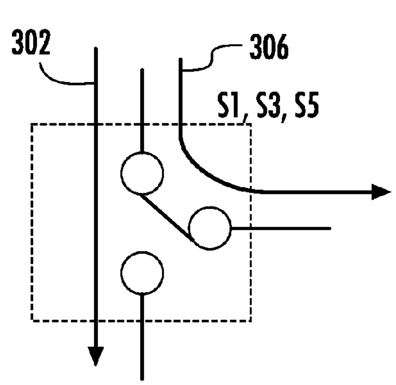
FIGS. 3 and 4 are schematic diagrams of switches of FIG. 2.
Figure 4:
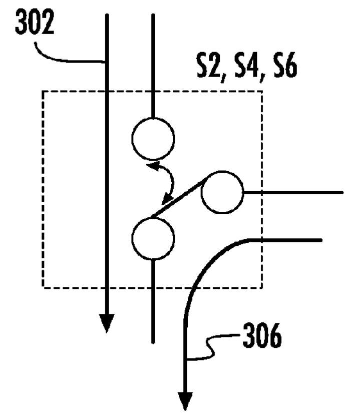

FIG. 3 is a schematic diagram of switches S1, S3, and S5, while FIG. 4 is a schematic diagram of switches S2, S4, and S6. As illustrated, when each SCFCL for phases A, B, and C having cryogenic tanks 240-1, 240-2, and 240-3 are in service, current flows through switches S1, S3, S5 along path 302, through each respective SCFCL 206-1, 206-2, 206-3, and through switches S2, S4, and S6 along the same path 302 illustrated in FIG. 4. When one SCFCL is demoted, respective switches upstream and downstream of the SCFCL are repositioned to remove that SCFCL from service and promote the spare. For example, if the first SCFCL 206-1 on Phase A is demoted, switches S1 and S2 would be positioned in a bypass position so current flows via path 306 as illustrated in FIGS. 3 and 4 with other switch pairs (switch pair S3, S4 and switch pair S5, S6) remaining in a non-bypass position so current would flow along path 302 as illustrated in FIGS. 3 and 4. The switches illustrated in FIGS. 3 and 4 may be "make before break" type switches such that current begins to conduct through the fourth SCFCL 206-4 prior to the demoted SCFCL being removed from the circuit. This guarantees current continuity through the three phase SCFCL system 218 and prevents a momentary open circuit.

Figure 5:
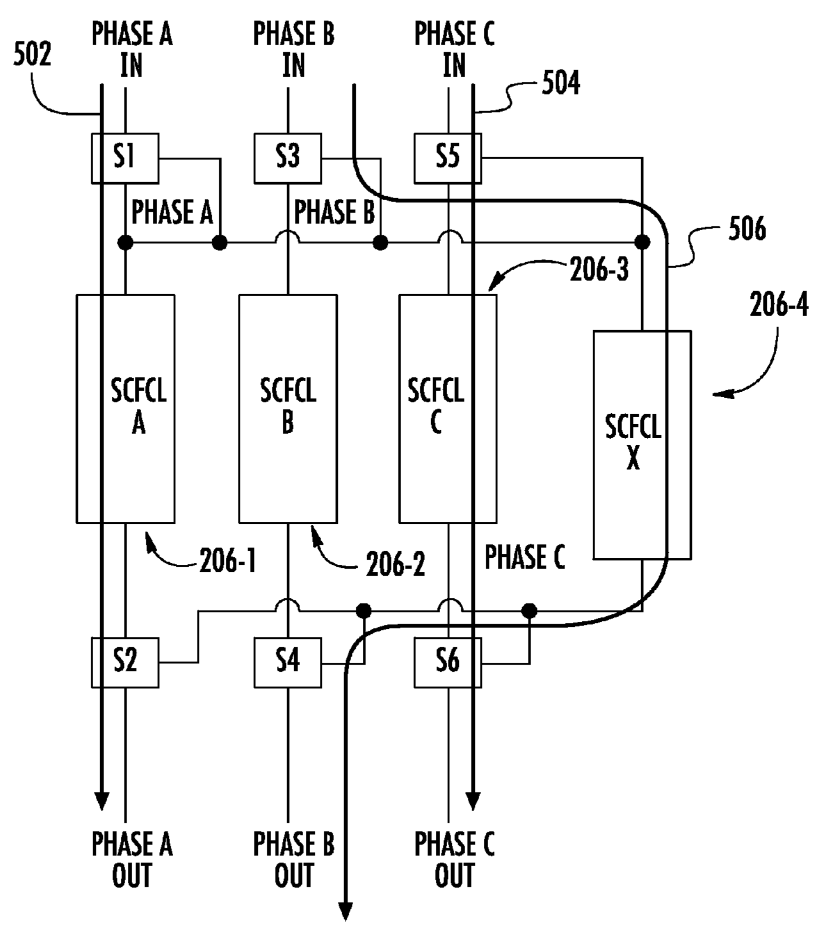
FIG. 5 is a block diagram consistent with FIG. 2 illustrating a current flow.

Turning to FIG. 5, an example of the SCFCL system 218 of FIG. 2 is is illustrated. During a first operating mode, the first SCFCL 206-1, the second SCFCL 206-2, and the third SCFCL 206-2 are in service and current for each phase flows though an associated upstream switch, the SCFCL, and the downstream switch. For example, phase A current would flow though the first switch S1, the first SCFCL 206-1, and the second switch S2 along path 502.

During another operating mode, one SCFCL, may be demoted and the fourth SCFCL 206-1 may be promoted into service. The example of FIG. 5 illustrates a case where the second SCFCL 206-2 for phase B has been demoted. Switches S1 and S2 for phase A and switches S5 and S6 for phase C remain in a non-bypass position so current continues to flow along paths 502, 504 respectively. However, switches S3 and S4 are positioned in a bypass position so current for Phase B now flows along path 506 through the fourth SCFCL 206-4. Meanwhile, the demoted second SCFCL 206-2 may be maintained, repaired, or replaced.

The triggering events for which SCFCL should be demoted are similar to that earlier described with respect to FIG. 1. In addition, the fourth SCFCL 206-4 of FIGS. 2 and 5 may be kept in an immediate stand-by state or a latent stand-by state as earlier detailed with respect to the second SCFCL 106-2 of FIG. 1.

There has thus been provided a SCFCL system having at least one spare SCFCL. The SCFCL system may promote the spare SCFCL to enable a demoted SCFCL to be maintained, repaired, or replaced. Accordingly, reliability of the SCFCL system may be improved compared to that with no spare. One or more spares may be used. In addition, the SCFCL system has additional flexibility to promote and demote differing SCFCLs into and out of service as necessary. The promotion and demotion may also automatically in response to a monitored condition.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

What is claimed is:

1. A superconducting fault current limiter (SCFCL) system comprising:

a first SCFCL;

a second SCFCL; and a controller configured to control at least one switch to couple the first SCFCL to a power line between an AC source and a load, and to electrically isolate the second SCFCL from the power line during a first operating mode when the first SCFCL is in service and the second SCFCL serves as a spare, wherein the controller is further configured to control the at least one switch to couple the second SCFCL to the power line between the AC source and the load, and to electrically isolate the first SCFCL from the power line during a second operating mode when the second is SCFCL is promoted into service and the first SCFCL is demoted from service.

2. The SCFCL system of claim 1, wherein the controller automatically changes from the first operating mode to the second operating mode in response to a condition of the first SCFCL.

3. The SCFCL system of claim 2, wherein the condition comprises an aggregate number of fault current conditions experienced by the first SCFCL.

4. The SCFCL system of claim 2, wherein the condition comprises an elapsed time period representative of a need for maintenance of the first SCFCL.

5. The SCFCL system of claim 2, wherein the condition comprises a fault of a component of the first SCFCL.

6. The SCFCL system of claim 5, wherein the component comprises a refrigeration system configured to provide a cryogenic cooling fluid to a cryogenic tank of the first SCFCL.

7. The SCFCL system of claim 1, wherein the controller is further configured to maintain the second SCFCL in a latent standby state during the first operating mode, wherein no cryogenic cooling fluid is provided to a cryogenic tank of the second SCFCL during the latent standby state.

8. The SCFCL system of claim 1, wherein the controller is further configured to maintain the second SCFCL in an immediate standby state during the first operating mode, wherein a refrigeration system is configured to provide a cryogenic cooling fluid to a cryogenic tank of the second SCFCL during the immediate standby state, the cryogenic cooling fluid sufficient to maintain a temperature of a superconductor positioned within an interior volume of the cryogenic tank of the second SCFCL below a critical temperature of the superconductor.

9. A three phase superconducting fault current limiter (SCFCL) system comprising:

a first SCFCL for a first phase having a first switch coupled to an input of the first SCFCL and a second switch coupled to an output of the first SCFCL;

a second SCFCL for a second phase having a third switch coupled to an input: of the second SCFCL and a fourth switch coupled to an output of the second SCFCL;

a third SCFCL for a third phase having a fifth switch coupled to an input of the third SCFCL and a sixth switch coupled to an output of the third SCFCL;

a fourth SCFCL having an input coupled to the first switch, third switch, and fifth switch and an output coupled to the second switch, fourth switch, and sixth switch; and a controller configured to position the first switch, the second switch, the third switch, the fourth switch, the fifth switch, and the sixth switch to have a current flow through the first SCFCL, the second SCFCL, and the third SCFCL and to electrically isolate the fourth SCFCL during a first operating mode when the first SCFCL, the second SCFCL, and the third SCFCL are in service and the fourth SCFCL serves as a spare.

10. The three phase SCFCL system of claim 9, wherein the controller is further configured to reposition the third switch and fourth switch to electrically isolate the second SCFCL and to electrically couple the input of the fourth SCFCL to the third switch and the output of the output of the fourth SCFCL to the fourth switch during a second operating mode when the fourth SCFCL is promoted into service and the second SCFCL is demoted from service.

11. The three phase SCFCL system of claim 10, wherein the controller automatically changes from the first operating mode to the second operating mode in response to a condition of the second SCFCL.

12. The three phase SCFCL system of claim 11, wherein the condition comprises an aggregate number of fault current conditions experienced by the second SCFCL.

13. The three phase SCFCL system of claim 9, wherein the controller is further configured to maintain the fourth SCFCL in a latent standby state during the first operating mode, wherein no cryogenic cooling fluid is provided to a cryogenic tank of the fourth SCFCL during the latent standby state.

14. The three phase SCFCL system of claim 9, wherein the controller is further configured to maintain the fourth SCFCL in an immediate standby state during the first operating mode, wherein a refrigeration system is configured to provide cryogenic cooling fluid to a cryogenic tank of the fourth SCFCL, during the immediate standby state, the cryogenic cooling fluid sufficient to maintain a temperature of a superconductor positioned within an interior volume of the cryogenic tank of the fourth SCFCL below a critical temperature of the superconductor.

* * * * *